United States Patent [19]

Buhrer

[11] 4,245,179
[45] Jan. 13, 1981

[54] PLANAR ELECTRODELESS FLUORESCENT LIGHT SOURCE

[75] Inventor: Carl F. Buhrer, Framingham, Mass.

[73] Assignee: GTE Laboratories Incorporated, Waltham, Mass.

[21] Appl. No.: 49,772

[22] Filed: Jun. 18, 1979

[51] Int. Cl.³ ............... H05B 41/16; H05B 41/24
[52] U.S. Cl. ................................. 315/248; 315/57; 315/70; 315/85; 336/226; 336/232
[58] Field of Search ............... 315/39, 57, 248, 344, 315/85, 70; 313/242, 485; 336/226, 232

[56] References Cited

U.S. PATENT DOCUMENTS

| 3,316,380 | 4/1967 | Pansing | 315/248 X |
| 3,942,058 | 3/1976 | Haugsjaa et al. | 315/248 |
| 3,942,068 | 3/1976 | Haugsjaa et al. | 315/248 |
| 3,943,404 | 3/1976 | McNeill et al. | 315/248 |
| 3,987,334 | 10/1976 | Anderson | 315/248 |
| 3,987,335 | 10/1976 | Anderson | 315/248 |
| 4,017,764 | 4/1977 | Anderson | 315/248 |
| 4,117,378 | 9/1978 | Glascock, Jr. | 315/248 |
| 4,119,889 | 10/1978 | Hollister | 315/248 |
| 4,171,503 | 10/1979 | Kwon | 315/344 |
| 4,187,445 | 2/1980 | Houston | 315/248 |
| 4,187,447 | 2/1980 | Stout et al. | 315/85 |
| 4,195,249 | 3/1980 | Ariga et al. | 313/493 |

Primary Examiner—Saxfield Chatmon, Jr.
Attorney, Agent, or Firm—William R. McClellan

[57] ABSTRACT

A light source includes a planar electrodeless fluorescent lamp. The lamp envelope has two parallel light transmitting plates separated and sealed by a spacing frame, has a phosphor coating on its inner surface, and encloses a fill material which emits ultraviolet radiation upon excitation by high frequency power. The phosphor coating emits visible light upon absorption on ultraviolet radiation. An induction coil for excitation of the lamp by high frequency power includes conductive loops located on the surface of the lamp with the plane of each loop parallel to the plane of the lamp. The induction coil is configured so that current flow in adjacent loops is in opposite directions in order to minimize the far field radiation level.

11 Claims, 7 Drawing Figures rescent light sources having a planar structure and having for excitation an induction coil which produces minimal far field electromagnetic radiation levels other than visible light.

PLANAR ELECTRODELESS FLUORESCENT LIGHT SOURCE

CROSS-REFERENCE TO RELATED APPLICATION

C. F. Buhrer, "Electrodeless Fluorescent Light Source Having Reduced Far Field Electromagnetic Radiation Levels," Ser. No. 49,773 filed concurrently with the present application and assigned to the same assignee as the present application, discloses electrodeless fluorescent light sources with induction coil structures having reduced far field radiation levels.

BACKGROUND OF THE INVENTION

This invention relates to electrodeless fluorescent light sources excited by high frequency power. More particularly, this invention relates to electrodeless fluorescent light sources having a planar structure and having for excitation an induction coil which produces minimal far field electromagnetic radiation levels other than visible light.

Conventional high brightness fluorescent lamps provide long life and efficient operation but require large, heavy and expensive ballasting circuits for operation at line frequencies. The low pressure glow discharge in mercury vapor that provides the phosphor excitation in fluorescent lamps is usually powered by a current at the power line frequency between two internal emissive electrodes. Current control is required because of the negative impedance characteristic of the discharge, and this is obtained by means of the series inductive impedance of an iron core ballast. In addition, as one attempts to make small fluorescent lamps, power losses connected with the electrodes become an increasingly large fraction of the applied power. Electrodeless excitation of the glow discharge by radio frequency fields has the potential advantage of providing a light weight system by eliminating the usual ballast. Also, without the usual filaments, lamp life would be increased.

Several approaches to electrodeless fluorescent lamps have been taken in the past. In one approach, frequencies in the range of 10 to 500 KHz were used with ferrite structures designed to link the high frequency magnetic field through a closed loop of plasma discharge. In U.S. Pat. No. 3,500,118 issued Mar. 10, 1970 to Anderson and U.S. Pat. No. 3,521,120 issued July 21, 1970 to Anderson, there are disclosed electrodeless fluorescent light sources which utilize a magnetically induced radio frequency electric field to ionize a gaseous radiating medium. Ferrite cores are utilized to couple energy to the discharge. A great variety of geometries are possible. For example, the use of closed loop ferrite core circuits to minimize stray fields that can radiate was disclosed in U.S. Pat. No. 4,005,330 issued Jan. 25, 1977 to Glascock, Jr. et al.

In a second approach, the frequencies are in the 3 to 300 MHz range, and no ferrites are needed. In U.S. Pat. No. 4,010,400 issued Mar. 1, 1977 to Hollister, radio frequency power is coupled to a discharge medium contained in a phosphor coated envelope by an induction coil with a nonmagnetic core connected to a radio frequency source. Radiation by the magnetic dipole field of the excitation coil is a problem.

A third approach to electrodeless fluorescent light sources, utilizing even higher frequencies in the 100 MHz to 300 GHz range, was disclosed by Haugsjaa et al in pending U.S. application Ser. No. 959,823 filed Nov. 13, 1978 and assigned to the assignee of the present invention. High frequency power, typically at 915 MHz, is coupled to an ultraviolet-producing low pressure discharge in a phosphor-coated electrodeless lamp which acts as a termination load within a termination fixture. Electromagnetic radiation is less of a problem at the higher frequencies of operation because shielding can be accomplished with a fine conductive mesh which blocks only a small percentage of the light output. At lower frequencies of operation, such as those disclosed in the Hollister patent, a heavier conductive mesh is required to accomplish effective shielding because of the reduced skin effect at lower frequencies. The heavier mesh is impractical because more of the light output is blocked.

Regardless of the frequency range utilized for exciting the glow discharge of a fluorescent lamp the control of electromagnetic radiation at the operating frequency and its harmonics is of high priority. In the low frequency range, a lamp system utilizing a free running class C oscillator coupled through a coil or ferrite structure to a discharge radiates harmonics randomly dispersed through the 500–1600 KHz broadcast band and gives severe radio interference. In the higher frequency range the effect is similar, but the interference is to other classes of radio and television services. In general, therefore, the operating frequency should be fixed and chosen for electromagnetic compatibility, the power source should be well shielded with its output filtered to remove harmonics, and the coupling system and glow discharge geometry should be chosen to minimize radiation. The power source aspect of this problem was recognized in U.S. Pat. No. 4,048,541 issued Sept. 13, 1977 to Adams et al wherein a power source for an electrodeless fluorescent lamp was designed to eliminate second harmonics.

Applicant's above-identified application Ser. No. 49,773 disclosed an approach to minimizing radio frequency radiation. Radio frequency currents are induced in a gas discharge by a magnetic field configured to have an essentially zero net dipole moment. An induction coil is shaped to provide a field that has low level in the far field. The discharge vessel or lamp is phosphor coated and has the general shape of a cylinder with a central cavity for insertion of the induction coil, thus forming an electrodeless lamp with two concentric walls. The fill material is usually a mixture of mercury and an inert gas. The discharge in the lamp is in the form of loops of plasma current each inductively driven by one of the maxima of the magnetic field configuration.

While the above-described electrodeless fluorescent light source gives generally satisfactory performance, it has certain disadvantages. Under such excitation ultraviolet light at 2537 A is produced by the mercury vapor discharge and becomes reabsorbed and reemitted many times before reaching the phosphor coated glass walls. This so-called self-trapping process limits the efficiency of the fluorescent lamp operation and depends on both the mean distance to the phosphor coated wall and the mercury pressure, the latter being controlled by the lamp temperature and power loading. The coaxial wall geometry described allows an optimization of the mean distance to the wall, but presents other difficulties resulting from the nonequivalence of the inner and outer wall surfaces. For example, the inner surface is not as well cooled by the ambient, and its phosphor coating runs at a higher temperature than that on the outer wall. Moreover, light emitted by the inner phosphor layer is more apt to be lost during the multiple scattering processes required for it to find its way out of the lamp.

SUMMARY OF THE INVENTION

It is an object of the present invention to provide a planar electrodeless fluorescent lamp.

It is a further object of the present invention to provide an electrodeless fluorescent lamp in which lamp efficiency can be controlled nearly independently of lamp surface area.

It is yet another object of the present invention to provide a planar electrodeless fluorescent light source wherein the far field electromagnetic radiation, other than visible light, is minimized.

According to the present invention, these and other objects and advantages are achieved in a planar electrodeless fluorescent lamp which includes a lamp envelope, a fill material, and a phosphor coating. The lamp envelope includes two light transmitting substantially flat plates in parallel arrangement with a space therebetween and means for enclosing the space between said flat plates to form an enclosed volume. The fill material, enclosed within said lamp envelope, emits ultraviolet radiation upon excitation by high frequency power. The phosphor coating, disposed on the inner surface of the lamp envelope, emits visible light upon absorption of ultraviolet radiation.

According to another aspect of the present invention, a planar electrodeless fluorescent light source includes a planar electrodeless fluorescent lamp, as above-described, and means associated with said lamp for excitation of the fill material by high frequency power. The excitation means can include induction coil means located in sufficiently close proximity to said lamp to cause excitation of the fill material. The induction coil means can include opposing magnetic dipole moments in order to minimize the net magnetic dipole moment of the light source. As a result, the magnitude of the far field electromagnetic radiation, produced directly by the induction coil means is minimized.

For a better understanding of the present invention, together with other and further objects, advantages and capabilities thereof, reference is made to the following disclosure and appended claims in connection with the above-described drawings.

DESCRIPTION OF THE PREFERRED EMBODIMENTS

Figure 1:
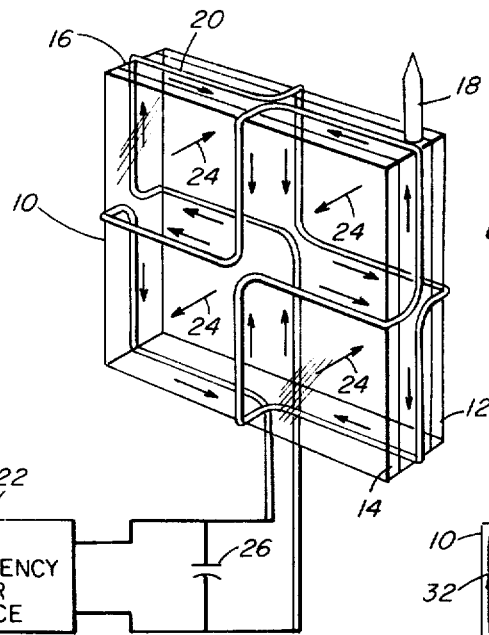
FIG. 1 is a perspective view of a planar electrodeless fluorescent light source according to the present invention.

Referring now to FIG. 1, there is shown a planar electrodeless fluorescent light source including a planar electrodeless fluorescent lamp 10 and means for excitation of lamp 10. The planar lamp 10 includes two light transmitting flat plates 12 and 14 in parallel arrangement with a space between them. The flat plates 12 and 14 can be glass or other suitable light transmitting material. The plates shown are square, but any desired shape can be used without departing from the scope of the present invention. Plates 12 and 14 are typically of the same shape and size relative to each other, however. Flat plates 12 and 14 are separated and enclosed by a spacing frame 16, which is typically made of a light transmitting material such as glass. Frame 16 can be described as a strip of material of uniform width which is located just inside the edges of flat plates 12 and 14 and which forms a closed loop. The width of frame 16 is much less than the dimensions of flat plates 12 and 14. Thus, when flat plates 12 and 14 are sealed to opposite sides of frame 16, the assembly forms an enclosed volume. Flat plates 12 and 14 and frame 16 together form the lamp envelope of the present invention. A tubulation 18 on one edge of planar lamp 10 is used to evacuate the lamp envelope and to introduce the lamp fill material. The lamp fill material is one which emits ultraviolet radiation upon excitation by high frequency power, and is typically a mixture of mercury and an inert gas, such as argon. After the fill material has been introduced into the lamp envelope, the tubulation 18 is sealed. The lamp envelope includes, on its inner surface, a phosphor coating which emits visible light upon absorption of ultraviolet radiation. The phosphor coating can be any of the conventional phosphors used in commercially available fluorescent lamps.

As shown in FIG. 1, the means for excitation of the planar electrodeless fluorescent lamp is an induction coil 20 which can be coupled to a high frequency power source 22. As used in this disclosure, the term "induction coil" is intended to include any configuration of an elongated conductor which has the purpose of coupling magnetic fields to an electrodeless lamp and is not limited to a series of spirals or rings. Induction coil 20 is formed from a fairly stiff conductor and is wound along the faces and edges of planar lamp 10 in such a way that the lamp fill material is uniformly excited and simultaneously the net magnetic dipole moment of the light source is minimized. Induction coil 20 forms a conductive loop around the periphery of each of the four quadrants of planar lamp 10. The conductor is configured so that at any instant the current around adjacent loops is in opposite directions and the current around loops on a diagonal is in the same direction. Thus the current in the upper left and lower right quadrants is clockwise whereas the current in the upper right and lower left quadrants is counterclockwise. Each of the four current loops produces a magnetic dipole moment 24, as shown in FIG. 1, which is normal to the plane of the conductive loop. Since the current in adjacent conductive loops is in opposite directions, dipole moments 24—24 are also in opposite directions in adjacent quadrants. The indicated directions of current flow reverse with time because of the alternating input current.

The induction coil 20 results in a low level of far field electromagnetic radiation. When viewed from the far field, or distances much greater than the dimensions of induction coil 20, the dipole contribution from each conductive loop on the surface of planar lamp 10 is offset by the contribution from the adjacent conductive loop to give a net dipole moment of approximately zero. The resulting field in a practical induction coil 20 is not exactly zero because of imperfections in the coil construction and because of second order effects. One requirement for the above discussion to hold true is that the length of the conductor used to form induction coil 20 be small in comparison with the wavelength of the excitation signal. This is necessary to insure that there is no phase retardation between radiation from dipole moments of the various conductive loops. Therefore, if an electrodeless fluorescent light source is operated at 40.68 MHz, which has a wavelength of about 7.4 meters, the maximum dimensions of induction coil 20 are a few centimeters to avoid problems of phase retardation. To give a minimum far field electromagnetic radiation level, the essential requirement is that each dipole moment be offset by another dipole moment of opposite polarity.

The light source shown in FIG. 1 can include a high frequency power source 22 which has its output coupled to induction coil 20. The power source 22 is in the frequency range from 1 MHz to 100 MHz. Two preferred frequencies of operation are 13.56 MHz and 40.68 MHz which are both in ISM (Instrument, Scientific, and Medical) bands set aside for devices such as the light source herein disclosed. The power source 22 should have a stable output frequency and preferably be crystal controlled to avoid interference with radio services. Any suitable high frequency power source can be used, such as the power source shown in U.S. Pat. No. 4,048,541 issued Sept. 13, 1977 to Adams et al. The high frequency power source 22 can be mechanically packaged with electrodeless lamp 10 and induction coil 20 to produce a complete fluorescent light source having a 60 Hz line frequency input. The power source 22 can also include a filter at its output. The purpose of the filter is to remove harmonics and other spurious outputs of high frequency power source 22, thereby reducing electromagnetic radiation at frequencies other than that chosen for operation of the light source. The filter is typically a low-pass filter having a cutoff frequency just above the operating frequency. A capacitor 26 can be connected across induction coil 20 to tune it to resonance at the frequency of operation.

Figure 2:
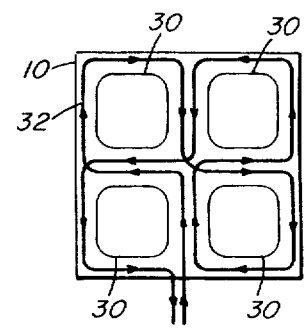
FIG. 2 is a front view of a square four cell, planar electrodeless fluorescent lamp illustrating an induction coil configuration and the flow of plasma currents.

In operation, the oscillating magnetic field generated by induction coil 20 and high frequency power source 22 penetrates the inner wall of electrodeless lamp 10 and induces four loops of plasma current in the fill material adjacent to each conductive loop. FIG. 2 illustrates the four plasma current loops 30—30. Induction coil 32 is similar to induction coil 20 in FIG. 1 but is located entirely on one surface of planar lamp 10. Adjacent plasma current loops are of opposite phase. These regions of plasma emit ultraviolet radiation which excites the phosphor coating to produce visible light. A planar electrodeless fluorescent lamp 5 cm square by 1 cm thick and excited by an induction coil as shown in FIG. 1 was operated at 40.68 MHz. The phosphor coating and lamp fill material were of conventional type used in fluorescent lamps.

The geometry of the planar electrodeless fluorescent lamp shown in FIG. 1 is desirable for several reasons. As described above, reabsorption of ultraviolet radiation which is dependent on the distance to the phosphor coating, limits the efficiency of known fluorescent lamps. In the planar electrodeless fluorescent lamp of the present invention, the spacing of the parallel plate lamp envelope walls and hence the mean distance from the point of ultraviolet photon generation to the phosphor coating can be varied to optimize lamp efficiency nearly independently of the lamp surface area. Also, the visible light emitted by the phosphor more readily leaves the lamp than in the case of a coaxial discharge tube. Finally, the planar lamp has a more uniform temperature distribution than the coaxial discharge tube.

The induction coil 20 shown in FIG. 1 is only one example of induction coils which can be used to excite planar electrodeless fluorescent lamps in accordance with the present invention. It is not essential for operation of the light source that the induction coil have equal and opposing dipole moments that result in a minimum net dipole moment. This feature serves to minimize the electromagnetic radiation of the light source and therefore increase its electromagnetic compatibility. The use of an induction coil which has multiple conductive loops adjacent to the lamp envelope serves to more uniformly distribute the total plasma excitation in the area of the planar lamp than if it were to be inductively excited by a single current loop with a magnetic field of constant phase over the area.

Although induction coil 20 in FIG. 1 is wound partially along the front and back surfaces and partially along the edges of planar lamp 10, this is not a requirement of the present invention. Various other induction coil geometries can be used to operate the lamp. For example, the induction coil can be located entirely on the front or back surface of planar lamp 10, or can be located partially on the front surface and partially on the back surface with a crossover point at the edge. Also, two identically wound induction coils can be located on the front and back surfaces of planar lamp 10 and can be connected in parallel to high frequency power source 22.

Figure 3:
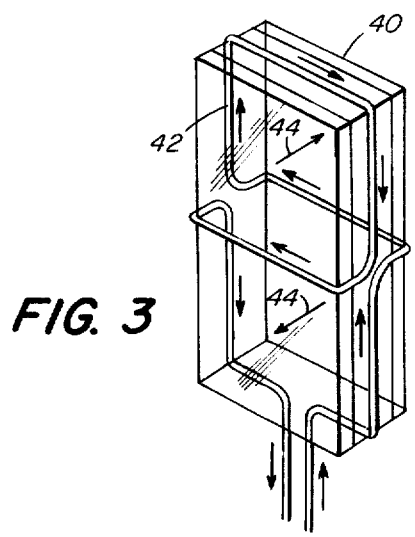
FIG. 3 is a perspective view of a two cell planar electrodeless fluorescent lamp illustrating an induction coil configuration.
Figure 4:
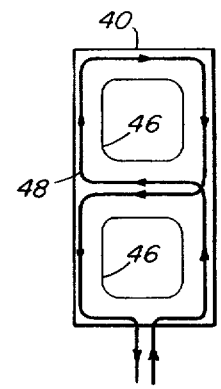
FIG. 4 is a front view of a two cell planar electrodeless fluorescent lamp illustrating an induction coil configuration and the flow of plasma currents.
Figure 5:
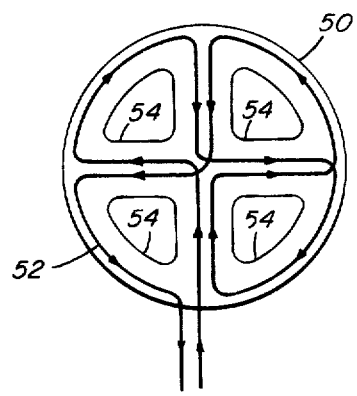
FIG. 5 is a front view of a circular four cell planar electrodeless fluorescent lamp illustrating an induction coil configuration and the flow of plasma currents.

Variations in the size and shape of the planar electrodeless fluorescent lamp require corresponding variations in the induction coil geometry. FIG. 3 illustrates a rectangular shaped planar lamp 40 with an induction coil 42 formed as two conductive loops. The current direction in the two conductive loops is in opposite directions and therefore results in opposing dipole moments 44—44. Thus, the far field radiation level produced by the rectangular light source is minimized. Plasma currents 46—46 are induced in the lamp fill material, as shown in FIG. 4, and are of opposite phase. Induction coil 48 is similar to induction coil 42 but is located entirely on one surface of planar lamp 40. A circular planar electrodeless fluorescent lamp 50 is illustrated in FIG. 5. Induction coil 52 is configured in a manner similar to that shown for square planar lamps. Each quadrant of the circular planar lamp 50 has a conductive loop around that quadrant. The current in adjacent conductive loops is in opposite directions, thus resulting in mutually opposing magnetic dipole moments and a minimized far field radiation level. Plasma currents 54—54 are induced in the fill material. Adjacent plasma current loops are of opposite phase.

Figure 6:
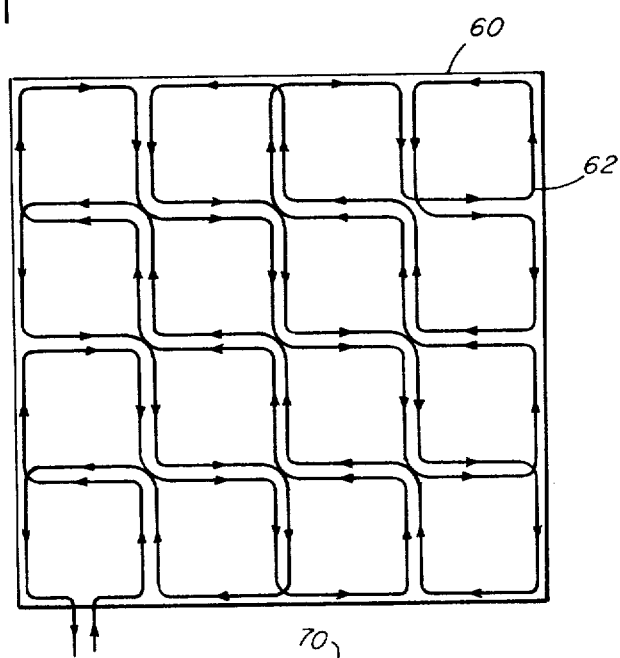
FIG. 6 is a front view of a sixteen cell planar electrodeless fluorescent lamp illustrating an induction coil configuration.
Figure 7:
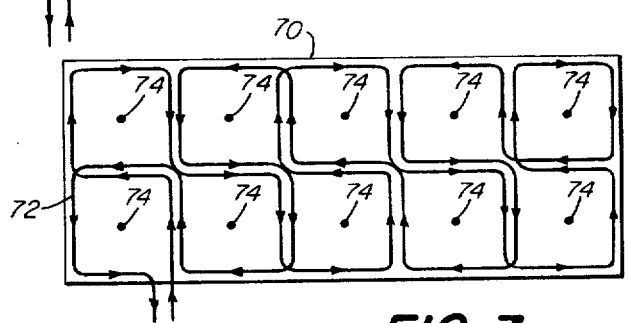
FIG. 7 is a front view of a ten cell planar electrodeless fluorescent lamp illustrating an induction coil configuration.

When constructing induction coils for excitation of larger planar electrodeless fluorescent lamps, it is desirable to utilize arrays of conductive loops on the surface of the planar lamp. In order to maintain uniform excitation of the lamp fill material, the conductive loops are preferably in the range of 1 cm to 5 cm. FIG. 6 illustrates a square planar electrodeless fluorescent lamp 60 having an induction coil 62 with sixteen conductive loops. The basic configuration of the four conductive loop induction coil has been extended so that all adjacent conductive loops have current flow in opposite directions and diagonal conductive loops have current flow in the same direction. An examination of each conductive loop in FIG. 6 confirms this statement. FIG. 7 illustrates a rectangular planar electrodeless fluorescent lamp 70 having an induction coil 72 with ten conductive loops. The basic induction coil configuration has again been extended to result in an induction coil 72 with current flow in opposite directions in adjacent conductive loops and current flow in the same direction in diagonal conductive loops.

While induction coil 62 in FIG. 6 and induction coil 72 in FIG. 7 are each formed from a single conductor, the planar lamps in FIG. 6 and FIG. 7 can be excited by a plurality of smaller induction coils connected in parallel to the high frequency power source. For example, four of the induction coils 32 shown in FIG. 3 can be located on the surface of planar lamp 60 and connected in parallel to a high frequency power source. Likewise, five of the induction coils 48 shown in FIG. 4 can be located on the surface of planar lamp 70 and connected in parallel to a high frequency source. The induction coil or coils can be secured to the planar lamp surface by any suitable means, such as by cementing. The use of multiple induction coils connected in parallel reduces the problem of phase retardation in the long conductors required when a single induction coil is used for excitation of large planar lamps.

When planar electrodeless fluorescent lamps, such as planar lamp 70 in FIG. 7, are constructed with large dimensions, the dimension between supports provided by the spacing frame is correspondingly large. Since planar lamp 70 is normally operated with an internal pressure well below atmospheric pressure, additional support for the flat plates can be used to strengthen the lamp envelope against the force of atmospheric pressure. Support posts 74—74, typically made of glass, extend between the two flat plates of planar lamp 70 and are secured to both flat plates. Support posts 74—74 are located in the center of plasma loops where the plasma current is zero.

While there has been shown and described what are at present considered the preferred embodiments of the invention, it will be obvious to those skilled in the art that various changes and modifications may be made therein without departing from the scope of the invention as defined by the appended claims.

What is claimed is:

1. A planar electrodeless fluorescent light source comprising:

a planar electrodeless fluorescent lamp including a lamp envelope including two light transmitting substantially flat plates in parallel arrangement with a space therebetween and means for enclosing said space between said plates to form an enclosed volume, said lamp envelope having an inner surface and two planar outer surfaces, a fill material, enclosed within said lamp envelope, which emits ultraviolet radiation upon excitation by high frequency power, and a phosphor coating, disposed on the inner surface of said lamp envelope, which emits visible light upon absorption of ultraviolet radiation; and means associated with said lamp for excitation of said fill material by high frequency power, including induction coil means located in sufficiently close proximity to said lamp to cause excitation of said fill material and including a conductor disposed on at least one of said outer surfaces to form a plurality of substantially non-overlapping conductive loops, each in a plane substantially parallel to said outer surfaces.

2. The planar electrodeless fluorescent light source as defined in claim 1 wherein said induction coil means has a net magnetic dipole moment and includes opposing magnetic dipole moments in order to minimize the net magnetic dipole moment of said induction coil means whereby the magnitude of the far field electromagnetic radiation, produced directly by said induction coil means is minimized.

3. The planar electrodeless fluorescent light source as defined in claim 2 wherein said induction coil means comprises an even number of conductive loops.

4. The planar electrodeless fluorescent light source as defined in claim 3 wherein said excitation means further includes a high frequency power source coupled to said induction coil means.

5. The planar electrodeless fluorescent light source as defined in claim 4 wherein said high frequency power source causes current to flow in said conductor and wherein said conductor is configured so that the current around adjacent conductive loops is in opposite directions and current around conductive loops on a diagonal is in the same direction.

6. The planar electrodeless fluorescent light source as defined in claim 5 wherein said excitation means further includes, coupled to said induction coil means, means for tuning said induction coil means to resonance.

7. The planar electrodeless fluorescent light source as defined in claim 6 wherein said high frequency power source operates in the range from 1 MHz to 100 MHz.

8. The planar electrodeless fluorescent light source as defined in claim 1 wherein said means for enclosing said space between said plates includes a spacing frame having a uniform width which determines the spacing of said plates, said frame being disposed between said plates.

9. The planar electrodeless fluorescent light source as defined in claim 8 further including a support post between said flat plates for strengthening said lamp envelope against the force of atmospheric pressure.

10. The planar electrodeless fluorescent light source as defined in claim 4 wherein said conductor has a length which is small in comparison with the wavelength of an excitation signal provided by said power source.

11. The planar electrodeless fluorescent light source as defined in claim 3 wherein said conductive loops have dimensions in the range between one centimeter and five centimeters.

* * * * *